US008645641B2

(12) United States Patent
Baum et al.

(10) Patent No.: US 8,645,641 B2
(45) Date of Patent: Feb. 4, 2014

(54) INTELLIGENT STORAGE DEVICE CONTROLLER

(75) Inventors: Michael Edward Baum, Longmont, CO (US); Jim Joseph Touchton, Boulder, CO (US); Timothy Richard Feldman, Louisville, CO (US); Mike Montemorra, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 1077 days.

(21) Appl. No.: 12/336,909

(22) Filed: Dec. 17, 2008

(65) Prior Publication Data

US 2010/0153680 A1      Jun. 17, 2010

(51) Int. Cl.
     *G06F 13/10*          (2006.01)
(52) U.S. Cl.
     USPC .......................................... 711/154
(58) Field of Classification Search
     USPC ....................................... 710/8–19
     See application file for complete search history.

(56) References Cited

U.S. PATENT DOCUMENTS

| | | | | |
|---|---|---|---|---|
| 4,736,373 A * | 4/1988 | Schmidt | ........................ | 714/711 |
| 5,493,676 A * | 2/1996 | Amundson | ..................... | 714/42 |
| 5,960,451 A | 9/1999 | Voigt et al. | .................... | 711/114 |
| 5,974,474 A * | 10/1999 | Furner et al. | ..................... | 710/8 |
| 6,065,096 A | 5/2000 | Day et al. | ...................... | 711/114 |
| 6,330,621 B1 | 12/2001 | Bakke et al. | ..................... | 710/5 |
| 6,493,811 B1 | 12/2002 | Blades et al. | ................. | 711/203 |
| 6,892,249 B1 * | 5/2005 | Codilian et al. | ................... | 710/5 |
| 6,925,525 B2 | 8/2005 | Blendermann et al. | ....... | 711/111 |
| 7,000,088 B1 | 2/2006 | Rudeseal et al. | ............. | 711/173 |
| 7,185,168 B2 | 2/2007 | Rudeseal et al. | ............. | 711/173 |
| 7,269,612 B2 | 9/2007 | Devarakonda et al. | ....... | 707/205 |
| 2002/0066001 A1 * | 5/2002 | Olarig et al. | .................. | 711/170 |
| 2002/0194440 A1 * | 12/2002 | Ghosh et al. | .................. | 711/156 |
| 2003/0033497 A1 | 2/2003 | Blades et al. | ................. | 711/202 |
| 2004/0098394 A1 | 5/2004 | Merritt et al. | ................. | 707/100 |
| 2004/0123213 A1 * | 6/2004 | Welbon et al. | ................ | 714/752 |
| 2004/0186935 A1 * | 9/2004 | Bell et al. | ........................ | 710/72 |
| 2006/0053263 A1 * | 3/2006 | Prahlad et al. | ................ | 711/162 |
| 2006/0259866 A1 * | 11/2006 | Prasad et al. | ................... | 715/747 |
| 2009/0300227 A1 * | 12/2009 | Nochimowski et al. | ........ | 710/18 |

* cited by examiner

*Primary Examiner* — Aimee Li
*Assistant Examiner* — Nicholas Simonetti
(74) *Attorney, Agent, or Firm* — Alan G. Rego; Westman, Champlin & Koehler, P.A.

(57) ABSTRACT

In a particular embodiment, a storage device includes a controller that is adapted to receive environmental data from a plurality of environmental sensors, where the environmental data is related to an operating environment of the storage device. Further, the controller is adapted to receive state information related to the data storage medium from a plurality of firmware detectors, to weight the received environmental data and the received state information according to a pre-determined weighting table, and to dynamically manage at least one attribute of the storage device based on the weighted environmental data and the weighted state information.

24 Claims, 6 Drawing Sheets

FIG. 3

| Outputs / Inputs | Servo Loop Shape | Write Fault Threshold | Adjacent Track Verification | Settle Criteria | Seek Profile | Head Clearance | NVC Usage | Intelligent Background Scan | Memory Partitioning (NVC vs. Disc) |
|---|---|---|---|---|---|---|---|---|---|
| Temp | M | L | M | L | M |  | M |  |  |
| Rotational Vibration |  |  |  |  | M |  | M |  |  |
| Altitude |  |  | L | M | M | H |  |  | M |
| Write Retry Rate | M | M | M |  |  |  | M |  |  |
| Read Error Rate |  |  | L |  |  |  |  |  | L |
| Dynamic Error Recovery Retry Depth |  |  |  |  |  | M |  | M |  |
| Other Error History |  | M |  |  |  |  |  |  |  |
| Workload |  |  |  | M |  |  |  | M |  |
| Power (AC vs. Battery) |  |  |  |  | M | M | M |  | M |
| Bits in Error |  |  |  |  |  |  |  |  |  |
| Market Segment |  |  | M |  |  |  |  |  |  |

INTELLIGENT STORAGE DEVICE CONTROLLER

FIELD

The present invention relates generally to an intelligent storage device controller, and more particularly, but not by limitation to, data storage devices that include an intelligent storage device controller.

BRIEF DESCRIPTION OF THE DRAWINGS

FIG. 3 is a particular illustrative embodiment of a table representing a weighting scheme for multiple environmental and performance feedback inputs for use with an intelligent storage device manager, such as the intelligent storage device managers illustrated in FIGS. 1-2;

DETAILED DESCRIPTION OF ILLUSTRATIVE EMBODIMENTS

Areal densities of data storage media have increased, but read/write head tolerances, head clearance, disc defect geometries, and track mis-registration are not consistently scaling with the areal density. In a particular example, a head field gradient versus head width trapezoidal pole is becoming triangular and losing surface area. Further, the maximum saturation magnetism head clearance is often not scaling, and neither are the overcoat thicknesses. Further, reduced clearance margin targets are creating more contact modulation in the field (during operation) due to particle contamination, and such clearance margin targets are often not scaling well. Moreover, the track mis-registration is not scaling at higher bandwidths. In a particular example, the settle bandwidths are not scaling and settle time performance requirements do not support a desired reliability. Further, reliability goals are increasing, including targeted reductions in annual failure rate, reduction in defective parts per million (DPPM), and increased mean time between failures (MTBF). While reliability goals are increasing, performance considerations are often in conflict with such reliability goals. Embodiments described below provide solutions to these and other problems, and offer other advantages over the prior art.

Figure 1:
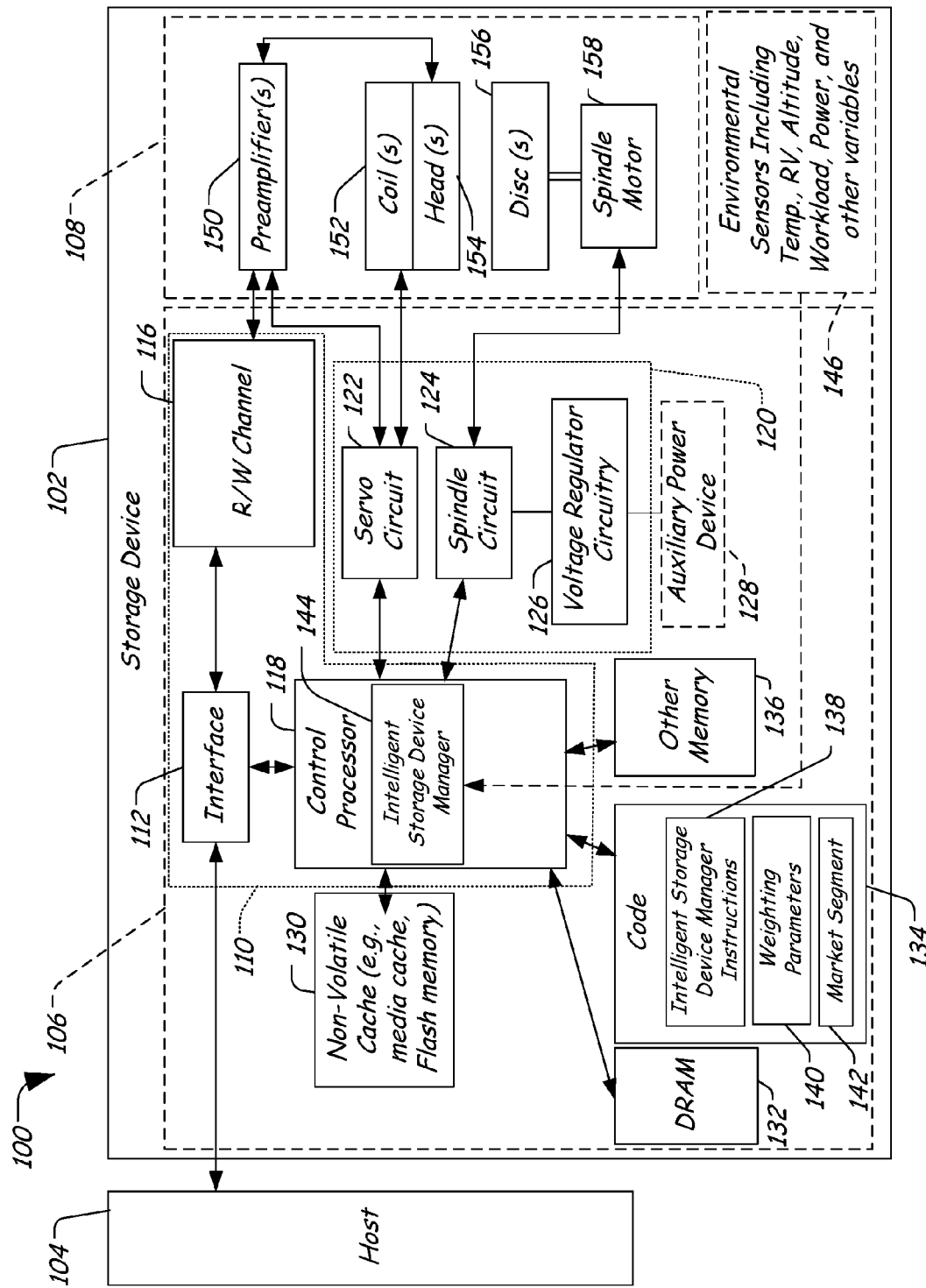
FIG. 1 is a block diagram of a particular embodiment of a system including a data storage device having an intelligent storage device manager.

FIG. 1 is a block diagram of a particular embodiment of a system 100 including a storage device 102 having an intelligent storage device manager. The storage device 102 is adapted to receive data and data storage commands from a host system 104 via an interface 112. In a particular example, the host system 104 can be a computing device, such as a portable computer, a mobile communications device, a personal digital assistant, a portable music/video player, another computing device, or any combination thereof. The interface 112 can include a data bus and an associated connector, such as an advanced technology attachment (ATA)/ATA with Packet Interface (ATAPI), a universal serial bus (USB) interface, another interface, or any combination thereof. In a particular example, the storage device 102 can be located within the host system 104, and the interface can include a data bus internal to the host system 104.

The storage device 102 is a hybrid storage device. As used herein, the term "hybrid storage device" refers to a data storage device that includes at least two non-volatile storage media, such as magnetic or optical storage media and solid-state storage media. As used herein, the term "solid-state storage media" refers to a storage media that uses electrical, magnetic, or optical properties of a circuit medium to store data. In a particular example, the solid-state storage media can utilize atomic spin, charge density, magneto-resistance, or other physical properties of the storage media to represent data values.

The storage device 102 includes recording subsystem circuitry 106 and a head-disc assembly 108. The recording subsystem circuitry 106 includes storage device read/write control circuitry 110 and disc-head assembly control circuitry 120. The recording subsystem circuitry 106 further includes an interface circuit 112, which has a data buffer for temporarily buffering data and a sequencer for directing the operation of the read/write channel 116 and the preamplifier 150 during data transfer operations. The interface circuit 112 is coupled to the host system 104 and to a control processor 118, which implements an intelligent storage device manager 144 that is adapted to control operation of the storage device 102.

The control processor 118 is coupled to a servo circuit 122 that is adapted to control the position of one or more read/write heads 154 relative to one or more discs 156 as part of a servo loop established by the one or more read/write heads 154. The one or more read/write heads 154 are mounted to a rotary actuator assembly to which a coil 152 of a voice coil motor (VCM) is attached. A VCM includes a pair of magnetic flux paths between which the coil 152 is disposed so that the passage of current through the coil causes magnetic interaction between the coil 152 and the magnetic flux paths, resulting in the controlled rotation of the actuator assembly and the movement of the one or more heads 154 relative to the surfaces of the one or more discs 156. The servo circuit 122 is used to control the application of current to the coil 152, and hence the position of the heads 154 with respect to tracks of the one or more discs 156.

In a particular embodiment, the disc-head assembly control circuitry 120 includes the servo circuit 122 and includes a spindle circuit 124 that is coupled to a spindle motor 158 to control the rotation of the one or more discs 156. The storage device 102 includes voltage regulator circuitry 126 to control power to the spindle circuit 122 and to other circuitry within the storage device 102. The storage device 102 also includes an auxiliary power device 128 that is coupled to the voltage regulator circuitry 126 of the disc-head assembly control circuitry 120 and that is adapted to operate as a power source when power to the storage device 102 is lost. In a particular embodiment, the auxiliary power device 128 can be a capacitor or a rechargeable battery that is adapted to supply power to the storage device 102 under certain operating conditions. In a particular example, the auxiliary power device 128 can provide a power supply to the recording subsystem assembly 106 and to the disc-head assembly 108 to record data to the one or more discs 156 when power is turned off. Further, the auxiliary power device 128 may supply power to the recording subsystem assembly 106 to record data to a non-volatile cache 130 when power is turned off.

The storage device 102 also includes the non-volatile cache (NVC) 130, a dynamic random access memory (DRAM) 132, firmware 134, other memory 136, or any combination thereof. In a particular embodiment, the firmware 134 is accessible to the control processor 118 and is adapted to store intelligent storage device manager instructions 138, which are executable by the control processor 118 to provide the intelligent storage device manager 144 to control operation of the storage device 102. The firmware 134 also includes weighting parameters 140 that define a relative importance or weight of particular variables for use in adjusting performance criteria and/or otherwise managing operations of the storage device 102. In a particular embodiment, the weighting parameters 140 can be stored in a table or other file, which may be accessible to the control processor 118 to utilize weights and/or to update the weights. The firmware 134 also includes market segment parameters 142 that define a market segment in which the storage device 102 is used. The market segment parameters 142 can be used by the intelligent storage device manager 144 to control operation of the storage device 102. In a particular embodiment, the weighting parameters 140 and the market segment parameters 142 can be set during manufacturing, and the weighting parameters 140 can be dynamically adapted by the intelligent storage device manager 144 in the field as a function of learning algorithms that monitor the inputs. The storage device 102 further includes multiple environmental sensors 146, including sensors to measure ambient and mechanical variables, including temperature, humidity, rotational vibration, altitude, workload, power, and other variables. In a particular embodiment, the multiple environmental sensors 146 include an altitude sensor, a temperature sensor, a rotational vibration sensor, a power sensor, channel quality/BER, head clearance, humidity, and other sensors. The sensors can be adapted to measure various environmental parameters and to provide measurement data to the intelligent storage device manager 144 concurrently.

In a particular example, the control processor 118 is adapted to selectively load and execute the intelligent storage device manager instructions 138 from the code flash 134, which execution is represented by the intelligent storage device manager 144. The control processor 118 uses the intelligent storage device manager 144 to control operation of the storage device 102 relative to specific inputs (such as the environmental and mechanical variables from the environmental sensors 146) and weights (such as the weighting parameters 140) associated with those inputs.

In a particular embodiment, the intelligent storage device manager 144 is adapted to take one or more actions to adjust performance parameters (criteria) based on the environmental conditions (such as temperature, altitude, and other environmental parameters), storage command/workload activity (activity of the host system 104), error rate/error recovery (such as write retry rate, read error rate, dynamic error recovery process retry depth, and error history), device parameters (such as rotational vibration, spindle speed, power levels, power source (battery power), and other variables), device market segment (such as a portable computer versus a digital video recorder implementation), or any combination thereof. Further, it should be understood that certain actions, such as memory background scans and dynamic error recovery retries may be processor intensive and/or power intensive. Accordingly, the intelligent storage device manager 144 can selectively perform such operations when host activity associated with the host system 104 falls below an activity threshold and when available power is above a power threshold.

In a particular example, the intelligent storage device manager 144 is adapted to determine that the storage device 102 is likely being used in an airplane, based on measurement indicating a high altitude (from the environmental sensors 146), such as an altitude that is several miles above sea level, and based on a detected power source being battery power. In this particular instance, the intelligent storage device manager 144 can selectively employ memory partitioning to provide improved reliability, enhanced performance, reduced power consumption, and reduced acoustic noise. In particular, the intelligent storage device manager 144 can utilize the non-volatile cache 130 to store data received from the host system 104 instead of the one or more discs 156, until an external power supply is restored. Further, in this example, the intelligent storage device manager 144 can reduce power supplied to the spindle motor 158. In this example, using the non-volatile cache 130 allows the intelligent storage device manager 144 to reduce overall power consumption by turning off power to the spindle motor 158 and the read/write heads 154.

In another example, the intelligent storage device manager 144 detects a write retry rate that is greater than an error threshold and adjusts at least one of a servo loop shape, a write fault threshold, an adjacent track verification parameter, and a non-volatile cache usage parameter. In a particular example, the intelligent storage device manager 144 detects a write retry rate that exceeds an error threshold and can selectively employ memory partitioning by storing data at the non-volatile cache 130. Further, if the intelligent storage device manager 144 receives data indicating a high rotational vibration, the intelligent storage device manager 144 can switch to using the non-volatile cache 130 until the rotational vibration data indicates a stable state. At this point, the intelligent storage device manager 144 can adjust other parameters, which may have been adjusted in response to errors or other performance characteristics when the storage device was experiencing such vibration.

In another particular example, the intelligent storage device manager 144 can execute intelligent background scans based on a hierarchy of priorities to process already flagged but not yet serviced sectors of the storage media to enhance data integrity without sacrificing performance. In a particular example, the intelligent storage device manager 144 is adapted to detect read errors requiring re-reads and to determine host activity. When the host activity falls below an activity threshold, the intelligent storage device manager 144 can initiate an intelligent background scan to service data storage media errors. Depending on available power when the host activity falls below the activity threshold, the intelligent storage device manager 144 can selectively perform the intelligent background scan when an external power supply is available and not perform scan when the storage device is operating on battery power. In another particular example, an intelligent background scan can refer to servicing only those sectors that have already been flagged, so that the background scan is limited to selected portions of the one or more discs 156, rather than the entire storage area. The intelligent storage device manager 144 can selectively perform the intelligent background scans to enhance performance as a function of workload and error rates and/or as a function of marketplace (i.e., storage device implementation within a digital video recorder, within a server device, within a portable computing device, etc.). Such intelligent background scans can be used to fix storage problems before data is lost or becomes unrecoverable. In a particular example, the intelligent background scan can include conditional background scans, selective off-track scans after write faults (i.e., scanning or delayed scanning of adjacent tracks), scans for disc skips and shock events, other types of scans, or any combination thereof.

In still another example, the control processor 118 is adapted to control power supplied to one or more components of the storage device 102 via the voltage regulator circuitry 126. In response to particular environmental data and/or performance data, the intelligent storage device controller 118 can reduce power to particular circuitry. For example, when a rotational vibration (as determined from the environmental sensors 146) exceeds a threshold, the intelligent storage device manager 144 can store received data at the non-volatile cache 130 and reduce power supplied to the spindle circuit 124 and the spindle motor 158 thereby reducing overall power consumption. If the intelligent storage device manager 144 determines that the storage device 102 is at a high altitude (such as at an airplane in-flight altitude) based on state information (such as information that the storage device is operating on battery power) and based on environmental data (such as an altitude measurement), the intelligent storage device manager 144 can reduce such power consumption, assuming that the user is unlikely to have access to an external power supply and taking advantage of the available non-volatile cache 130 for data storage.

In yet another example, the intelligent storage device manager 144 can adjust a servo loop shape and verify adjacent tracks in response to detection of excessive rotational vibration. The intelligent storage device manager 144 can also tighten write fault threshold parameters in response to a write retry rate that is greater than a write retry threshold and to modify settle criteria and/or servo loop shape when the write fault threshold falls below the write retry threshold. Further, settle criteria and just-in-time seek parameters can be adjusted in response to high temperatures. In a particular example, particular environmental factors, such as temperature, may be weighted in terms of importance with respect to certain performance parameters. A high temperature reading determined by the environmental sensors 146 may have a medium importance with respect to the adjacent track verification parameters. In this instance, the intelligent storage device manager 144 can adjust the adjacent track verification parameters and optionally other parameters. Further, the intelligent storage device manager 144 can adjust a seek profile to reduce power consumption and acoustics as a function of environment, as a function of market segment, or any combination thereof. In an embodiment, the intelligent storage device manager 144 can adjust one or more parameters with little performance degradation, enhancing performance as a function of environment, workload and error rate.

In a particular embodiment, it should be understood that certain operations, such as the intelligent background scan, may be performed when the host activity falls below a pre-defined activity threshold. In particular, it may be desirable to conserve resources to service host activities when the host activity is high and to perform the background actions and adjustments when the host activity falls below the threshold. By controlling when such operations are performed, overall performance can be enhanced without adversely impacting the responsiveness of the storage device 102 with respect to the host system 104.

Figure 2:
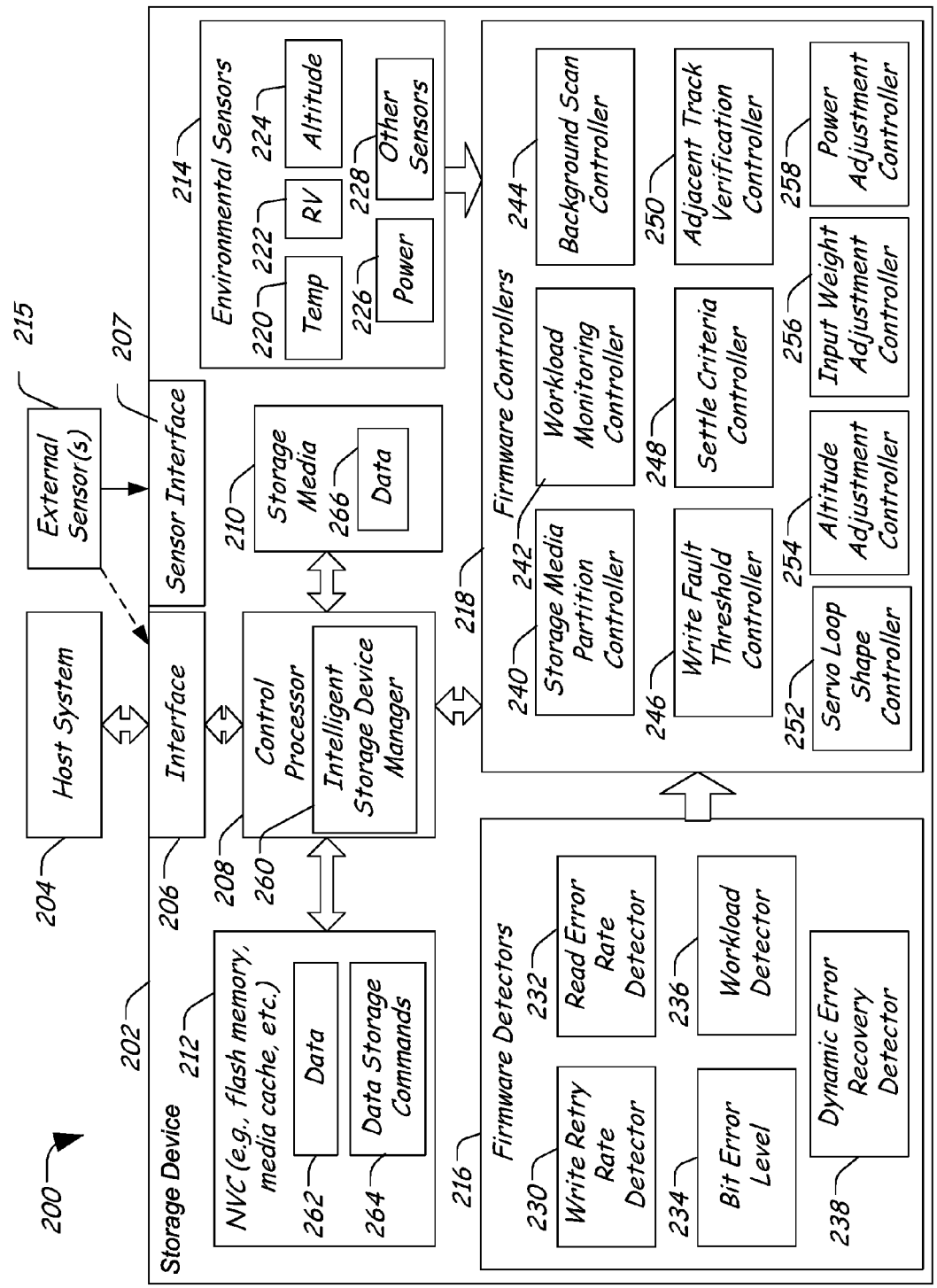
FIG. 2 is a block diagram of a second particular illustrative embodiment of a system including a data storage device having an intelligent storage device manager.

FIG. 2 is a block diagram of a second particular illustrative embodiment of a system 200 including a data storage device 202 having a control processor 208 adapted to provide an intelligent storage device manager 260. The storage device 202 is adapted to receive data and data storage commands from a host system 204. In a particular embodiment, the host system 204 can be a computer, a portable phone, a media player, another processing device, or any combination thereof.

The storage device 202 includes an interface 206 that is coupled to the host system 204 via a data bus. Further, the storage device 202 includes the control processor 208 that is coupled to the interface 206 and that is adapted to communicate with a non-volatile cache (NVC) 212 and with a storage media 210. The NVC 212 can be a solid-state memory, a portion of a solid-state memory, another non-volatile memory, or any combination thereof. In a particular example, the solid-state memory can be a flash memory. In a particular embodiment, the storage media 210 can be a second solid-state memory. Alternatively, the storage media 210 can include one or more rotatable discs adapted to store data, such as the data 266. Additionally, the control processor 208 is coupled to firmware controllers 218. The firmware controllers 218 are coupled to environmental sensors 214 and to firmware detectors 216.

In a particular embodiment, the system 200 can include one or more external sensors 215, which can be coupled to the control processor 208 via a sensor interface 207, via the interface 206 (directly or indirectly through the host system 204), or any combination thereof. The one or more sensors 215 can be added to the system 200 as needed or can be part of the host system 204. In a particular embodiment, the one or more external sensors 215 can provide data to the control processor 208 that relates to a state of the host system 204, an environmental parameter, other information, or any combination thereof for use by the control processor 208 in making intelligent decisions about how and whether to adjust one or more performance parameters associated with the storage device 202.

The environmental sensors 214 include a temperature sensor 220 that is adapted to measure an environmental temperature associated with a location at which the storage device 202 is operating. Further, the environmental sensors 214 include a rotational vibration sensor 222 that measures a rotational vibration associated with the storage media 210. Additionally, the environmental sensors 214 include an altitude sensor 224 to measure an altitude associated with the storage device 202. Moreover, the environmental sensors 214 include a power sensor 226 adapted to detect an available battery power level and to determine whether the storage device 202 is operating using battery power or power from an external power source. In an alternative embodiment, the power sensor 226 can be included in the firmware detectors 216. In a particular embodiment, the environmental sensors 214 can also include other sensors 228 and the system 200 can include one or more external sensors 215 that can contribute measurement data related to other parameters, including shocks, global-positioning satellite (GPS) data, moisture data, other parameters, or any combination thereof. Further, the other sensors 228 can include a humidity sensor. In a particular example, bearings associated with the storage media 210 (when the storage media 210 is a rotatable storage media) may be humidity sensitive, and the firmware controllers 218 may be adapted to adjust clearance parameters in the presence of high or low humidity.

The firmware detectors 216 are adapted to monitor performance characteristics associated with the storage device 202. The firmware detectors 216 include a write retry rate detector 230 that is adapted to monitor a write retry rate associated with writing data to the storage media 210. In a particular embodiment, the write retry rate detector 230 can compare the monitored write retry rate to a write retry rate threshold and can provide a write retry rate indicator to the intelligent storage device manager 260 when the write retry rate exceeds the write retry rate threshold. The firmware detectors 216 also include a read error rate detector 232 to monitor a read error rate and optionally to compare the read error rate to a threshold. The firmware detectors 216 further include a reduced T level detector 234 that is adapted to monitor bits in error. Further, the firmware detectors 216 include a workload detector 236 that is adapted to monitor host activity 204 and access activity related to the storage media 210. In a particular example, the host activity 204 may include storage media access activity. However, the access activity associated with the storage media 210 may include activity initiated by the control processor 208. Additionally, the firmware detectors 216 can include a dynamic error recovery detector 238 adapted to monitor dynamic error recovery processes and to adjust one or more performance parameters when the dynamic error recovery processes exceed an error threshold.

The firmware controllers 218 can include a storage media partition controller 240 that is adapted to partition data storage between the storage media 210 and the NVC 212. In a particular example, the storage media partition controller 240 is adapted to adjust a NVC parameter of the weighted parameters 140 and/or a media portioning parameter to adjust how received data is handled. In a particular example, data received from the host system 204 via the interface 206 can be stored at the NVC 212, including data 262 and data storage commands 364 and can later be moved (if desired) from the NVC 212 to the storage media 210.

The firmware controllers 218 further can include a workload monitoring controller 242 that is adapted to determine host activity and storage media activity for the storage device 202. Further, the firmware controllers 218 can include a background scan controller 244 that is adapted to initiate background scans of the storage media 210. Additionally, the firmware controllers 218 can include a write fault threshold controller 246 that is adapted to adjust write fault parameters in response to various measured parameters. Moreover, the firmware controllers 218 can include a settle criteria controller 248 adapted to adjust settle criteria in response to one or more measured parameters.

The firmware controllers 218 further can include an adjacent track verification controller 250 that is adapted to scan adjacent tracks in response to a write fault. Additionally, the firmware controllers 218 can include a servo loop shape controller 252 that is adapted to adjust a servo loop shape in response to detection a temperature that exceeds a temperature threshold and/or in response to detection of a write retry rate that exceeds a retry threshold. Further, the firmware controllers 218 can include an altitude adjustment controller 254 adapted to adjust one or more parameters based on a measured altitude. Additionally, the firmware controllers 218 can include an input weight adjustment controller 256 that is adapted to adjust weights associated with one or more of the measured parameters, which weights assign a relative importance to particular measured parameters with respect to particular adjustments to be made. Further, the firmware controllers 218 can include a power adjustment controller 258 that is adapted to selectively adjust a power supply to one or more circuits. In a particular example, the power adjustment controller 258 is adapted to turn off power to a spindle circuit and an associated spindle motor, such as the spindle circuit 124 and the associated spindle motor 158 illustrated in FIG. 1.

In a particular embodiment, the intelligent storage device manager 260 is adapted to receive performance data related to multiple performance parameters from one or more of the firmware detectors 216 and environmental data related to at least one of the environmental sensors 214. Additionally, the intelligent storage device manager 260 can receive data related to one or more external sensors 215. The intelligent storage device manager 260 is adapted to selectively adjust one or more performance parameters based on the received performance data and the received environmental data. In a particular example, the intelligent storage device manager 260 can utilize the background scan controller 244 to selectively execute a conditional background scan, an adjacent track scan, or a complete background scan. For example, when data errors are encountered, flags may be set in a register and a background scan may be initiated by the intelligent storage device manager 260 on the flagged portions of the storage media 210 when host activity falls below an activity threshold (as determined by the workload monitoring controller 242).

In another particular example, the intelligent storage device manager 260 can detect excessive rotational vibration (via the rotational vibration sensor 222) and selectively adjust a servo loop shape via the servo loop shape controller 252 and selectively perform an adjacent track verification via the adjacent track verification controller 250. In another example, in response to detection of a high temperature via the temperature sensor 220, the intelligent storage device manager 260 can adjust settle criteria via the settle criteria controller 248 and write fault thresholds via a write fault threshold controller 246.

In a particular example, multiple parameters may be adjusted by the intelligent storage device manager 260 based on a weights associated with multiple environmental measurements and monitored performance indicators. Any number of measured variables and performance indicators can be used to adjust thresholds, to adjust performance criteria, and to alter performance criteria. In a particular example, detection of high altitude via the altitude sensor 224, high rotational vibration via the rotational vibration sensor 222, low power or battery power via the power sensor 226, or any combination thereof may trigger the intelligent storage device manager 260 to alter a memory partitioning parameter via the storage media partition controller 240 to store data to the NVC 212 and to decrease power to the storage media 210. In this instance, data integrity may be preserved and power consumption can be reduced in response to detected operating conditions.

In a particular embodiment, the control processor 208 is coupled to the interface and coupled to first and second non-volatile storage media, such as the NVC 212 and the storage media 210. The control processor 208 is also coupled to the plurality of environmental sensors. The control processor 208 is adapted to execute an intelligent storage device manager 260 that is adapted to determine information related to the first and second non-volatile storage media, to weight environmental data related to the respective plurality of environmental parameters (based on one or more of the firmware controllers 218), and to selectively adjust at least one quality metric associated with the storage device 202 based on the determined state information and the weighted environmental data. The quality metric can be a servo loop shape, a settle criteria parameter, a seek profile parameter, a write fault threshold, an adjacent track verification parameter, a head clearance parameter, an NVC usage parameter, an intelligent backgrounds can parameter, a memory partitioning parameter, other parameters, or any combination thereof.

In a particular embodiment, a state change associated with a single sensed environmental parameter may not trigger action by the firmware controllers 218. For example, if a particular sensor is damaged or degraded, it may be desirable to prohibit that sensor from governing changes. In a particular example, the input weight adjustment controller 256 is adapted to de-rate or downgrade an importance associated with a particular sensor, if a signal from the sensor contradicts other environmental queues or contradicts predetermined rules. For example, if a humidity sensor shows a saturated environment and the altitude sensor 224 reads a high altitude, one of these parameters may be non-physical and at least one of the sensors should be disregarded. In this case, if the rotational vibration sensor 222 shows a low to medium activity at high altitude and at a nominal temperature, it may be presumed that a high humidity reading by a humidity sensor would be incorrect, and the firmware controllers 218 may react as if the storage device 202 were in an airplane environment.

FIG. 3 is a particular illustrative embodiment of a table 300 representing a weighting scheme for multiple environmental and performance feedback inputs for use with an intelligent storage device manager, such as the intelligent storage device managers illustrated in FIGS. 1-2. It should be understood that the table 300 is illustrative only, and that other environmental parameters and other weights can be used, depending on the particular implementation.

In table 300, the environmental inputs 302 (listed vertically along a left side of the table 300) may be weighted differently as to a plurality of parameters 304 (listed horizontally across the top of the table 300). The environmental inputs 302 include temperature, rotational vibration, altitude, write retry rate, read error rate, dynamic error recovery retry depth, other error history data, workload (host activity) data, power (AC vs. Battery), bytes in error threshold on a data sector basis, and market segment. The environmental inputs 302 can include other data as well, depending on the particular implementation. For example, for secure implementations, a radio frequency receiver may be used to receive radio frequency (RF) signals associated with a separate device (such as a dongle or a smart card), and the intelligent storage device controller may be adapted to adjust performance based on proximity to the separate device. The plurality of parameters (outputs) 304 can include a servo loop shape, a write fault threshold, adjacent track verification, settle criteria, seek profile, head clearance, non-volatile cache (NVC) usage, intelligent background scan, and memory partitioning (NVC vs. disc). The plurality of parameters (outputs) 304 can also include other parameters based on the particular implementation details.

In a particular embodiment, the various inputs 302 may be weighted differently with respect to each of the plurality of parameters (outputs) 304. In a particular example, a temperature input has a medium weight (M) as it pertains to servo loop shape, adjacent track verification, seek profile, and non-volatile cache (NVC) usage. In contrast, the temperature input has a low weight (L) as it pertains to settle criteria. The head clearance, intelligent background scan, and the memory partitioning parameters are not adjusted relative to the temperature input. With reference to an altitude input, the adjacent track verification has a low weight (L), the settle criteria parameter has a medium weight (M), and the head clearance has a high weight (H). In a particular instance, the weighting of particular inputs may be initially determined at a factory based on performance assumptions linking the particular inputs to the particular parameters. Such linkages refer to interactions between the inputs and the output parameters, and weights can be selectively assigned to each linkage.

In a particular example, the factory weights can be adjusted by the intelligent storage device controller, such as the intelligent storage device controller 118 illustrated in FIG. 1, the intelligent storage device controller 208 illustrated in FIG. 2, the intelligent storage device controller 310 illustrated in FIG. 3, or any combination thereof. In a particular example, the weights can be created at a factory and stored in firmware of the storage device. Further, the intelligent storage device controller is adapted to utilize the weights and/or to adjust the weights as necessary to enhance overall performance of the device. In a particular example, the weights can be applied to environmental and performance inputs by the intelligent storage device controller, which can use the weighted inputs to adjust outputs to the appropriate control function, as suggested by the table 300.

In an example, one particular input related to a market segment is shown, which may reflect a particular implementation associated with the storage device. For example, both customer expectations and related performance requirements for data storage devices included in a portable computer are different from those associated with data storage devices within a digital video recorder (DVR) associated with a commercial cable television decoder. In particular, since the DVR is not expected to operate while in motion and is not expected to operate on battery power, some of the output parameters are not relevant to the particular market segment criteria. Further, initial weighting for dynamic error recovery retry depth may not include factory settings, but the intelligent storage device manager is adapted to adjust or assign a weighting to enhance performance based on performance data, such as retry error depth history and other information. Further, other inputs, such as the workload input, can be weighted relative to write fault threshold and settle criteria to enhance performance of the storage device.

In a particular embodiment, by allowing the intelligent storage device controller to monitor environmental and performance parameters and to adjust performance parameters based on such monitored inputs and associated weights, the overall performance of the storage device can be enhanced dynamically to reduce power consumption, to reduce track mis-registrations, and to improve reliability with limited or no performance degradation. Further, by allowing for selective performance of background scans, errors can be reduced and overall reliability can be enhanced without noticeably effecting responsiveness as observed from an associated host device, for example.

Figure 4:
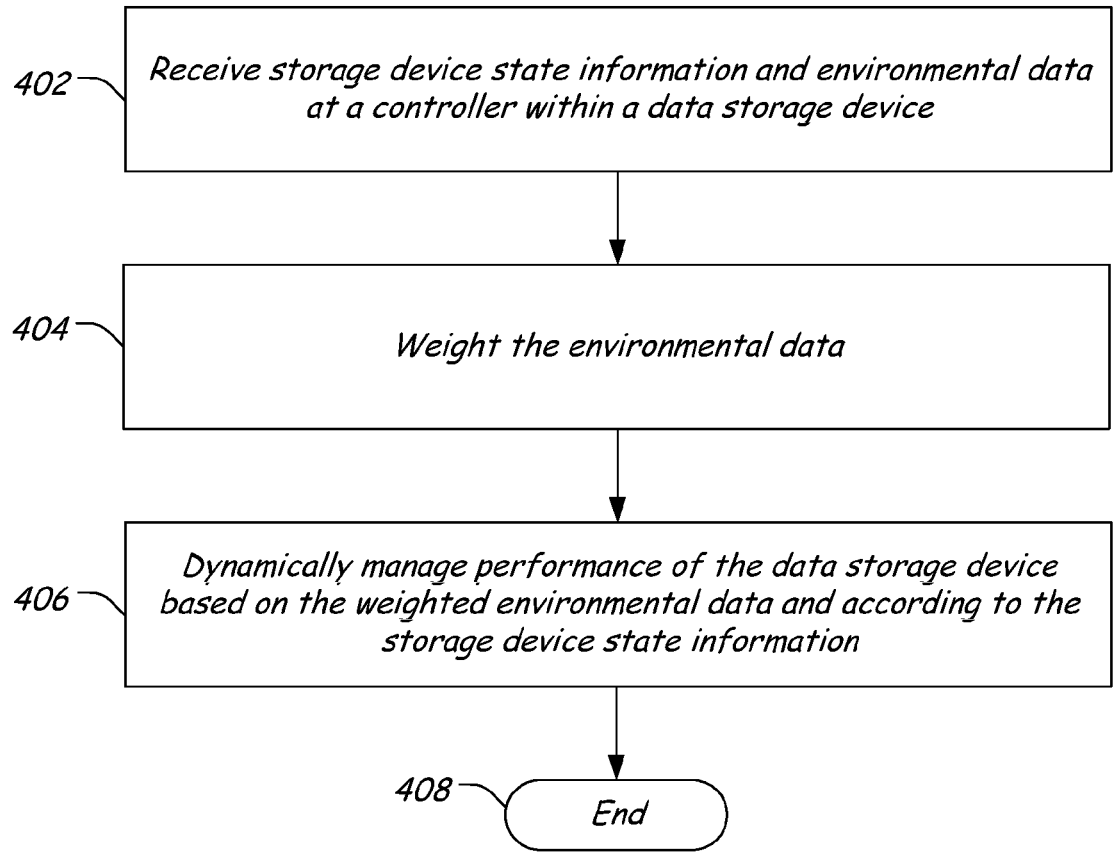
FIG. 4 is a flow diagram of a particular illustrative embodiment of a method of managing command response and workloads using a controller within a data storage device.

FIG. 4 is a flow diagram of a particular illustrative embodiment of a method of managing command response and workloads using a controller within a storage device that includes an intelligent storage device manager. At 402, storage device state information and environmental data are received at a controller within a storage device. In a particular embodiment, the storage device state information can include data related to access activity associated with a host system, access activity associated with reading from or writing to a storage media, write retry rate information, read error rate information, reduced T level information, dynamic error recovery data, power data, or any combination thereof. The environmental data can include temperature data, rotational vibration data, altitude data, other environmental data, or any combination thereof.

Continuing to 404, the environmental data are weighted according to at least one pre-determined weight. In a particular example, the environmental data can include any number of environmental measurements, each of which can be weighted according to different weights. In a particular embodiment, the weightings may ascribe a particular level of importance to each piece of environmental data, and each piece of environmental data can be ascribed different weights.

In a particular example, the weights for particular environmental data may vary based on operating conditions of the storage device.

Advancing to 406, at least one performance criteria associated with the data storage device is dynamically adjusted using the controller, where the at least one performance criteria is adjusted based on the weighted environmental data and according to the storage device state information. In a particular embodiment, the weighted environmental data can be used to identify particular operating conditions associated with the storage device and to selectively adjust one or more performance criteria of the storage device based on the weighted environmental data. In another particular embodiment, the at least one performance criteria can include a servo loop shape, a write fault threshold, an adjacent track verification parameter, a settle criteria, a seek profile, a head clearance, a non-volatile cache usage parameter, an intelligent background scan parameter, and a memory partitioning parameter. In a particular example, available memory can be partitioned to store data at a non-volatile cache when a rotational vibration exceeds a threshold and to write the data from the non-volatile cache to a first storage media when the rotational vibration falls below the threshold.

In another embodiment, internal data storage device processes and received data storage commands can be selectively executed based on the weighted environmental data and the workload data. In still another embodiment, the non-volatile cache usage parameter can be adjusted in response to the environmental data, including at least one of a temperature and a rotational vibration. In yet another embodiment, at least one of the write threshold, the settle criterion, the seek profile, and the servo loop shape associated with access to a storage media of the data storage device can be adjusted based on the environmental data. The method terminates at 408.

In a particular example, the weighted environmental data includes an altitude value, and dynamically adjusting at least one performance parameter includes adjusting a head clearance parameter based on the altitude value. In a particular embodiment, dynamically adjusting at least one performance parameter includes adjusting a parameter to selectively perform a background scan operation on particular portions of a storage media of the data storage device as a function of at least one of the workload data, a data error rate, and a market segment associated with the data storage device. The particular portions may be selected based on data error information determined by the controller during at least one read operation.

Further, the method can include dynamically adjusting the at least one pre-determined weight using the controller to apply a learning algorithm based on performance data. In a particular example, variations in manufacturing and environment may result in variations in how particular components of the storage device respond to particular adjustments and to particular conditions. Accordingly, in a particular storage device, temperature may have a greater impact in terms of data error rates than in other devices, and the intelligent controller is adapted to adjust parameters and to alter the outputs based on error data and other information to further enhance performance. For example, after a period of time, a particular factory settings of the particular weights may be adjusted to improve future performance.

Figure 5:
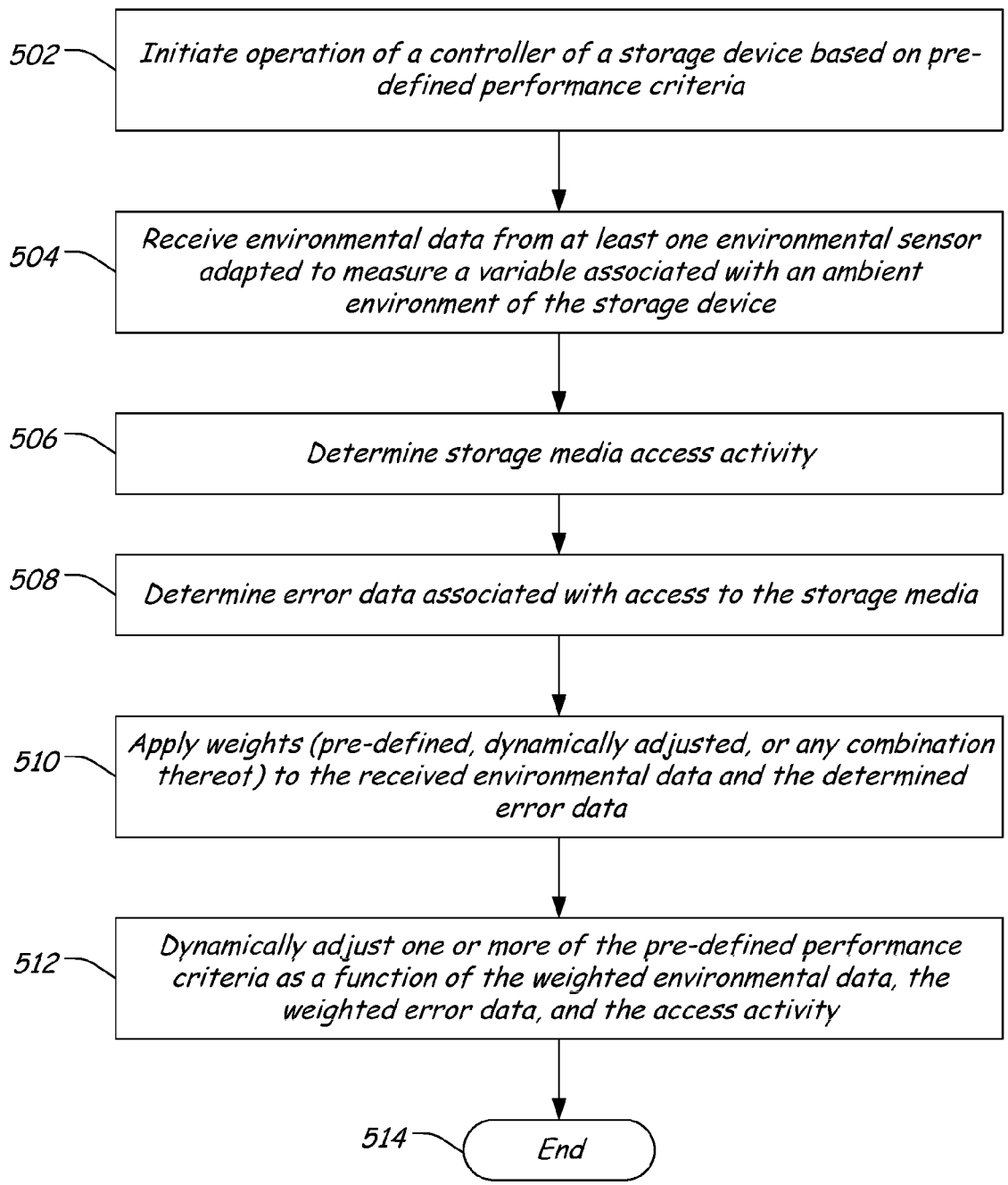
FIG. 5 is a flow diagram of a particular illustrative embodiment of a method of controlling operation of a data storage device based on host device access activity and environmental parameters.

FIG. 5 is a flow diagram of a particular illustrative embodiment of a method of controlling operation of a storage device based on host device access activity and environmental parameters. At 502, an operation of a controller of a storage device is initiated based on pre-defined performance criteria. For example, the controller can load the pre-defined performance criteria and various environmental thresholds from a memory, such as from firmware of the storage device. Advancing to 504, environmental data are received from at least one environmental sensor adapted to measure a variable associated with an ambient environment of the storage device. Such environmental variables can include a temperature measurement, an altitude measurement, a rotational vibration measurement, other measurements, or any combination thereof. Continuing to 506, storage media access activity is determined. In this particular example, the storage media access activity can include host activity and read/write operations associated with the storage media. Proceeding to 508, error data associated with access to the storage media are determined. The error data can include write retry rates, read error rates, dynamic error recovery retry rates, error history, other error data, or any combination thereof.

Moving to 510, weights (pre-defined, dynamically adjusted, or any combination thereof) are applied to the received environmental data and the determined error data. By applying the weights, the controller assigns a weighted link or association between the received data and a desired output associated with a performance parameter. Each environmental input may have a different weight relative to a particular parameter.

Advancing to 512, one or more of the pre-defined performance criteria are dynamically adjusted as a function of the weighted environmental data, the weighted error data, and the access activity. The pre-defined performance criteria can include current operating criteria. Further, such criteria can include a servo loop shape, a write fault threshold, an adjacent track verification parameter, a settle criteria, a seek profile, a head clearance, a non-volatile cache usage parameter, an intelligent background scan parameter, a memory partitioning (NVC vs. disc) parameter, other parameters, or any combination thereof. The parameters can also include a battery power level parameter, a power source (alternating current versus battery) parameter, other operating parameters (including user settings), or any combination thereof.

For example, the storage device may alter an operating mode from a non-queued mode (write direct to the primary storage media) to a queued mode (write data to a non-volatile cache and move data to the primary storage media when host activity falls below a threshold activity level). Additionally, the storage device may alter a head clearance parameter when an altitude measurement and other data suggest that the storage device is traveling within an airplane. Further, power consumption levels may be adjusted based on operating conditions to enhance overall system performance. The method terminates at 514.

Figure 6:
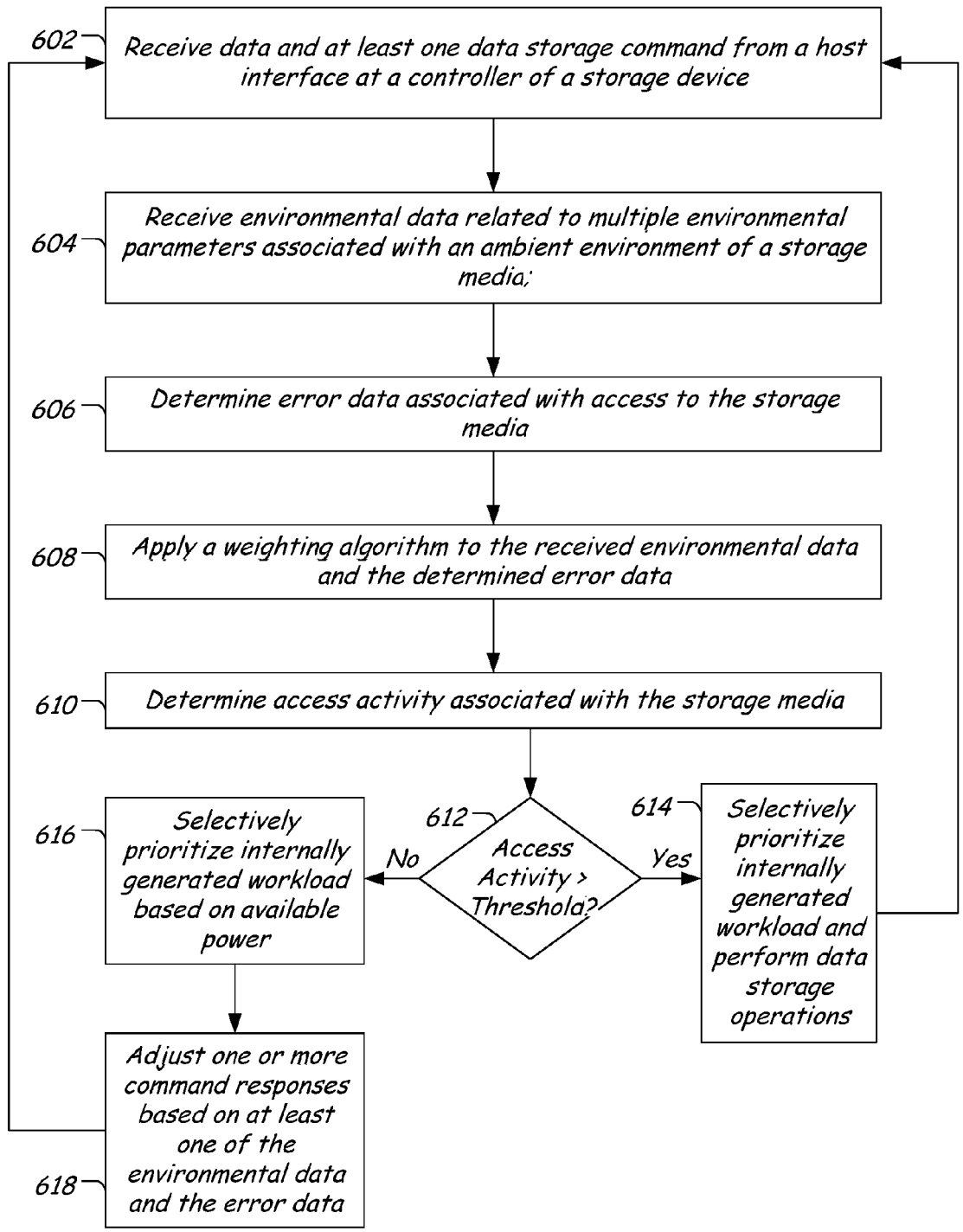
FIG. 6 is a flow diagram of a particular illustrative embodiment of a method of adjusting storage device parameters using a controller of a data storage device to enhance performance based on environmental conditions and host activity.

FIG. 6 is a flow diagram of a particular illustrative embodiment of a method of adjusting storage device parameters using a controller of the storage device to enhance performance based on environmental conditions and host activity. At 602, data and at least one data storage command are received from a host interface at a controller of a storage device. Proceeding to 604, environmental data related to multiple environmental parameters are received that are associated with an ambient environment of the storage device. The environmental data can also include operating conditions associated with the storage device, such as power source information, battery power levels, user settings, other information, or any combination thereof. Moving to 606, error data associated with access to the storage media is determined. Continuing to 608, a weighting algorithm is applied to the received environmental data and the determined error data. Advancing to 610, access activity associated with the storage media is determined. Proceeding to 612, if the access activity is greater than a threshold, the method advances to 614 and internally generated workload and data storage operations are selectively prioritized and performed. The method returns to 602, and data and at least one data storage command are received from the host interface at the controller of the storage device.

Returning to 612, if the access activity is less than the threshold, the method continues to 616 and internally generated workload is selectively prioritized based on available power. Advancing to 618, one or more command responses are adjusted based on at least one of the environmental data and the error data.

In a particular example, when access activity is high, internal tasks may be assigned a lower priority to ensure sufficient resources to service the host activity. When host activity falls below a threshold, the intelligent controller of the storage device can initiate operations in the background, such as background scans and other operations. Further, when the storage device is operating on battery power, the controller can utilize a queued mode involving a non-volatile cache to reduce power consumption due to spin up and write operations associated with writing data to rotatable storage media. Further, power to various circuits can be reduced or turned off to reduce power consumption and enhance overall system performance. Further, when heat, vibration, altitude or other environmental parameters affect performance, such environmental variables can be monitored and performance parameters can be adjusted accordingly to enhance performance.

In conjunction with the storage devices, controllers, and methods disclosed above with respect to FIGS. 1-6, a controller is disclosed that is adapted to receive environmental data related to multiple environmental parameters from a plurality of environmental sensors, where the environmental data is related to an operating environment of the storage device. The controller is further adapted to receive state information related to the storage device, to weight the received environmental data and the received state information according to a pre-determined weighting table, and to dynamically manage quality metrics of the storage device based on the weighted environmental data and the weighted state information. In a particular example, the controller is an intelligent controller that is adapted to adjust the weights and to dynamically alter performance criteria of the storage device based on the environmental parameters and on the state information.

It is to be understood that even though numerous characteristics and advantages of the various embodiments have been set forth in the foregoing description, together with details of the structure and function, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the storage device while maintaining substantially the same functionality without departing from the scope and spirit of the present disclosure. For example, particular performance criteria and weights may be omitted for storage devices that are to be used within a non-portable market segment (such as digital video recorders associated with cable or satellite television broadcast decoders) as compared to portable computing devices, such as portable computers.

In addition, although a preferred embodiment described herein is directed to a hybrid storage device having magnetic or optical storage media and a solid-state storage media, it will be appreciated by those skilled in the art that the teachings of the present disclosure can be applied to solid-state storage devices to adjust performance parameters to enhance overall performance, without departing from the scope and spirit of the present invention.

What is claimed is:

1. A data storage device comprising:
    a controller adapted to:
        apply different weights to a same input quantity based on degrees of relevance of the same input quantity to corresponding different ones of a plurality of attributes of the data storage device; and
        dynamically manage at least one of the plurality of attributes of the data storage device based on the weighted quantity,
        wherein the different weights comprise at least three weights, and
        wherein the same input quantity comprises environmental data from one of a plurality of environmental sensors in an operating environment of the data storage device or state data from one of a plurality of firmware detectors that receives state information related to the data storage device.

2. The data storage device of claim 1 and further comprising:
    a data storage medium, and
    wherein the state information related to the data storage device comprises state information related to the data storage medium.

3. The data storage device of claim 2, wherein the controller is further adapted to:
    apply the different weights to both the environmental data and the state data; and
    dynamically manage the at least one attribute of the data storage device based on the weighted environmental data and the weighted state data.

4. The data storage device of claim 3, wherein the controller is further adapted to dynamically update the weights.

5. The data storage device of claim 3, wherein the environmental data includes altitude information, wherein the state data indicates that a power source is a battery, and wherein the controller is adapted to adjust the at least one attribute based on a determination that the data storage device is in use at a high altitude that is several miles above sea level.

6. The data storage device of claim 5, wherein the data storage device comprises a disc media and a solid-state memory, and wherein the controller is adapted to:
    dynamically adjust a memory partitioning attribute to store data at the solid-state memory; and
    adjust a power attribute to reduce power to the disc media in response to determining that the data storage device is in use at the high altitude.

7. The data storage device of claim 3, wherein the state data includes workload data related to an access activity level associated with the data storage medium, data error rate information and power source data from the plurality of firmware detectors, and wherein the controller is adapted to adjust a particular attribute of the plurality of attributes to control performance of error correction operations.

8. The data storage device of claim 7, wherein the controller is adapted to selectively perform a background scan operation on particular portions of the data storage medium based on at least one of the access activity level, the data error rate and power source data.

9. The data storage device of claim 3, wherein the controller further comprises an input weight adjustment controller to reduce a weight, of the different weights, associated with a particular environmental parameter when the environment data associated with the particular environmental parameter is inconsistent with other environmental data from other sensors of the plurality of environmental sensors.

10. The data storage device of claim 3, wherein the controller is adapted to log historical error data and to selectively apply a learning algorithm to the historical error data to adjust at least some of the different weights, within a weighting table, for subsequent use.

11. The data storage device of claim 3, wherein the environmental data comprises at least one of rotational vibration data, temperature data, humidity data, and altitude data.

12. The data storage device of claim 3, wherein the state data comprises at least one of a write retry rate, a read error rate, a bit error level, a workload detector, and a dynamic error recovery detector.

13. The data storage device of claim 3, wherein the at least one attribute comprises at least one of a write threshold, a settle criterion, a seek profile, and a servo loop shape.

14. A data storage device comprising:
    an interface responsive to a host system;
    a first non-volatile storage medium;
    a second non-volatile storage medium; and
    a controller communicatively coupled to the interface, the first non-volatile storage medium and the second non-volatile storage medium, the controller adapted to:
        apply different weights to a same input quantity based on degrees of relevance of the same input quantity to corresponding different ones of a plurality of attributes of the data storage device;
        dynamically manage at least one of the plurality of attributes of the data storage device based on the weighted quantity,
    a plurality of environmental sensors adapted to monitor a respective plurality of environmental parameters to produce environmental data;
    a plurality of firmware detectors adapted to monitor state information related to the data storage device,
    wherein the same input quantity is the environmental data from any one of the plurality of environmental sensors or the state information from any one of the plurality of firmware detectors, and
    wherein the different weights comprise at least three weights.

15. The data storage device of claim 14, wherein the controller is further adapted to:
    apply the different weights to both the environmental data and the state information; and
    adjust the at least one attribute of the data storage device based on the weighted environmental data and the weighted state information.

16. The data storage device of claim 15 and wherein the controller is further adapted to dynamically update the weights.

17. The data storage device of claim 15, wherein the environmental data comprises:
    altitude data related to an operating altitude of the data storage device; and
    wherein the altitude data is weighted with respect to multiple attributes including a head clearance parameter, a settle criteria parameter, and an adjacent track verification parameter associated with the second non-volatile storage media.

18. The data storage device of claim 15, wherein the environmental data includes rotational vibration data, and wherein the controller is adapted to:
    adjust a seek profile attribute and a memory partitioning attribute in response to the rotational vibration data; and
    adjust a power profile attribute to reduce power to the second non-volatile storage medium.

19. The data storage device of claim 15, wherein the state information comprises an indication that the power source is a battery, and wherein the controller is adapted to:
    adjust a power attribute to reduce power to the second non-volatile storage medium; and
    adjust a partitioning attribute to direct data received from the interface to the first non-volatile storage medium, wherein the first non-volatile storage medium comprises a solid-state memory device.

20. The data storage device of claim 15, wherein the state information comprises:
    a power level associated with a battery; and
    wherein the controller is adapted to perform an intelligent background scan to fix data errors at the second non-volatile storage medium by servicing only sectors that have already been flagged for data errors, so that the intelligent background scan is limited to selected portions of the second non-volatile storage medium.

21. The data storage device of claim 15, wherein the state information includes a data error rate associated with read access and write access to the first and second non-volatile storage media and includes market data associated with a type of electronic device with which the first and second non-volatile storage media are used, and wherein the controller is adapted to selectively adjust a memory partition attribute to partition received data between the first and the second non-volatile storage media based on at least one of the weighted environmental data, the data error rate and the market segment data associated with a market of the data storage device.

22. A method comprising:
    applying different weights to a same input quantity data based on degrees of relevance of the same input quantity data to corresponding different ones of a plurality of attributes of a data storage device; and
    dynamically managing at least one of the plurality of attributes of the data storage device based on the weighted quantity,
    wherein the different weights comprise at least three weights, and
    wherein the same input quantity comprises environmental data from one of a plurality of environmental sensors in an operating environment of the data storage device or state data from one of a plurality of firmware detectors that receives state information related to the data storage device.

23. The method of claim 22, wherein the state information related to the data storage device comprises state information related to a data storage medium of the data storage device.

24. The method of claim 23 and further comprising:
    applying the different weights to both the environmental data and the state data; and
    dynamically managing the at least one attribute of the data storage device based on the weighted environmental data and the weighted state data.

* * * * *